US012759474B2

(12) United States Patent
Kenny et al.

(10) Patent No.: US 12,759,474 B2
(45) Date of Patent: Oct. 13, 2026

(54) MOUNTING RAIL FOR VEHICLE ACCESSORIES

(71) Applicant: GM Global Technology Operations LLC, Detroit, MI (US)

(72) Inventors: Sam Kenny, Grosse Ile, MI (US); Andrew Close, Victoria (AU)

(73) Assignee: GM Global Tehcnology Operations LLC, Detroit, MI (US)

( * ) Notice: Subject to any disclaimer, the term of this patent is extended or adjusted under 35 U.S.C. 154(b) by 409 days.

(21) Appl. No.: 18/497,092

(22) Filed: Oct. 30, 2023

(65) Prior Publication Data

US 2025/0136018 A1 May 1, 2025

(51) Int. Cl.
*B60R 11/02* (2006.01)
*B60R 16/023* (2006.01)
*B60R 16/03* (2006.01)

(52) U.S. Cl.
CPC .......... *B60R 11/02* (2013.01); *B60R 16/0231* (2013.01); *B60R 16/03* (2013.01)

(58) Field of Classification Search
CPC ......... B60R 11/02; E05B 73/00; E05B 79/00; E05B 79/10; E05B 81/00
USPC ........................................ 296/193.02; 70/237
See application file for complete search history.

(56) References Cited

U.S. PATENT DOCUMENTS 4,524,872 A * 6/1985 Chamberlain ........ E05B 67/383 211/8
5,027,622 A * 7/1991 Hatch ..................... E05B 67/36 70/161
5,128,847 A * 7/1992 Lin ...................... H01R 25/142 362/147
5,275,027 A * 1/1994 Eklof .................... A47F 5/0861 70/38 A
5,806,916 A * 9/1998 Sinner ................... B60R 21/205 296/72
6,338,517 B1 * 1/2002 Canni ....................... B60R 7/04 224/311
6,698,603 B2 * 3/2004 Lawson ................ A47F 5/0846 211/94.01
6,749,244 B1 * 6/2004 Song ....................... B60R 7/084 296/37.7
6,957,839 B1 * 10/2005 Tiesler ...................... B60R 7/04 296/214

(Continued)

FOREIGN PATENT DOCUMENTS

CN 109840980 A * 6/2019
CN 114368348 A * 4/2022 ............. B60K 37/00

(Continued)

*Primary Examiner* — Hilary L Gutman

(74) *Attorney, Agent, or Firm* — Honigman LLP; Matthew H. Szalach

(57) ABSTRACT

A mounting rail for a vehicle comprises a housing attached to the vehicle and including a first portion and a second portion, a first channel extending along the first portion of the housing between a first end and a second end, the first end defining an opening to the first channel, and a lock located proximate to the opening to the first channel, the lock disposed in a lock housing and movable relative to the lock housing between a locked state blocking entry into the opening of the first channel and an unlocked state spaced apart from the opening of the first channel.

20 Claims, 8 Drawing Sheets

(56) References Cited

U.S. PATENT DOCUMENTS

| | | | | |
|---|---|---|---|---|
| 7,269,983 | B1 * | 9/2007 | Mchatet | A47F 5/0861 70/57.1 |
| 8,925,993 | B2 * | 1/2015 | Noah-Navarro | B60H 1/0055 296/72 |
| 10,712,070 | B1 * | 7/2020 | Touchton | F25D 21/14 |
| 11,724,748 | B2 * | 8/2023 | Richardson | B62D 25/145 296/193.02 |
| 2002/0163219 | A1 * | 11/2002 | Clark | B60R 7/04 296/37.8 |
| 2003/0075955 | A1 * | 4/2003 | Tiesler | B60R 7/04 296/214 |
| 2003/0168875 | A1 * | 9/2003 | Anderson | B60R 7/04 296/37.8 |
| 2003/0192845 | A1 * | 10/2003 | Lawson | A47F 5/0846 211/94.01 |
| 2004/0016588 | A1 * | 1/2004 | Vitale | B60K 35/22 180/322 |
| 2004/0124654 | A1 * | 7/2004 | Song | B60R 7/04 296/37.7 |
| 2004/0169390 | A1 * | 9/2004 | Tiesler | B60R 11/02 296/37.8 |
| 2005/0076684 | A1 * | 4/2005 | Bistline | A63C 11/007 70/58 |
| 2005/0242604 | A1 * | 11/2005 | Bonnes | B60R 7/04 296/35.1 |
| 2009/0007614 | A1 * | 1/2009 | Armstrong | B60P 7/0807 70/287 |
| 2010/0223965 | A1 * | 9/2010 | Richardson | E05B 47/004 70/58 |
| 2017/0354246 | A1 * | 12/2017 | Wayner | A47B 96/1441 |
| 2025/0326443 | A1 * | 10/2025 | Harmon | B62D 33/0207 |
| 2026/0027963 | A1 * | 1/2026 | Zercoe | B60P 7/0815 |

FOREIGN PATENT DOCUMENTS

| | | | | | |
|---|---|---|---|---|---|
| DE | 19822638 | A1 * | 12/1999 | | B60R 7/04 |
| DE | 202010008065 | U1 * | 10/2010 | | E05B 73/00 |
| DE | 102009043767 | A1 | 3/2011 | | |
| DE | 102012009170 | A1 * | 11/2013 | | B60Q 3/74 |
| DE | 212016000059 | U1 | 4/2018 | | |
| DE | 102019212973 | B4 * | 11/2024 | | B60R 11/02 |
| EP | 0178196 | A1 * | 4/1986 | | B60R 11/02 |
| EP | 3738832 | A1 * | 11/2020 | | B60R 11/02 |
| FR | 3037300 | A1 * | 12/2016 | | B60R 11/02 |
| FR | 3095999 | A1 * | 11/2020 | | B60R 11/00 |
| FR | 3096000 | A1 * | 11/2020 | | B60R 11/02 |
| GB | 2037257 | A * | 7/1980 | | A45C 1/00 |
| GB | 2318564 | A * | 4/1998 | | B65G 7/02 |
| GB | 2380983 | A * | 4/2003 | | B60R 7/04 |
| JP | H08507988 | A * | 8/1996 | | B60R 9/045 |
| JP | H10264730 | A * | 10/1998 | | |
| WO | WO-9960670 | A1 * | 11/1999 | | H01R 13/6397 |
| WO | WO-0235037 | A1 * | 5/2002 | | E05B 73/0082 |
| WO | WO-2025030220 | A1 * | 2/2025 | | E05B 73/0017 |

* cited by examiner

MOUNTING RAIL FOR VEHICLE ACCESSORIES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a mounting rail and, more particularly, to a mounting rail for selectively attaching vehicle accessories within a passenger compartment of a vehicle.

Conventional vehicles typically include fixed vehicle controls and accessories. For example, entertainment systems such as radios, video displays, and controls for such radios and displays are permanently integrated with surrounding vehicle structure. In the case of a radio, physical knobs and/or a touchscreen may be integrated with an instrument panel (IP) of the vehicle and may be disposed in a fixed, permanent location on the IP to allow a driver and a passenger to have access to the radio and its controls. Video displays may be similarly integrated into the IP and/or may be integrated into a rear portion of a passenger compartment to allow second-row and/or third-row occupants to view and control such displays. The video displays may be permanently integrated into the IP, a headliner of the vehicle, and/or into vehicle seats to allow vehicle occupants to watch shows or movies while seated in the vehicle.

Other vehicle controls such as knobs, switches, and touchscreen displays may also be integrated into the IP and other vehicle structure to permit a driver or passenger to control operation of the vehicle and its accessories. For example, a series of knobs, switches, and/or touchscreen displays may be integrated into an IP for use by the driver and passengers in controlling a heating, ventilating, and air conditioning (HVAC) system of vehicle, for controlling operation of vehicle accessories such as a sunroof or heated/ventilated seats, or for controlling vehicle functions such as a parking brake or hood-release mechanism.

While fixed controls such as a knobs, switches, and touchscreen displays allow a vehicle driver and passengers to control a vehicle, vehicle systems, and vehicle accessories, such controls are not customized for the particular driver or passengers. As such, the location and/or function of such fixed controls may not be optimal for the particular driver and/or passengers. Accordingly, a need exists for providing vehicle controls that are customizable for a driver and/or passenger to allow the driver and/or passenger to customize a configuration of a vehicle to suit their particular needs.

SUMMARY

A mounting rail for a vehicle is provided and comprises a housing attached to the vehicle and including a first portion and a second portion, a first channel extending along the first portion of the housing between a first end and a second end, the first end defining an opening to the first channel, and a lock located proximate to the opening to the first channel, the lock disposed in a lock housing and movable relative to the lock housing between a locked state blocking entry into the opening of the first channel and an unlocked state spaced apart from the opening of the first channel.

The mounting rail may include one or more of the following optional features. For example, the lock may extend from an outer surface of the lock housing in the locked state and may be recessed from the outer surface of the lock housing in the unlocked state. The lock may be movable between the locked state and the unlocked state in response to a signal received from an external device. The external device may be at least one of a mobile phone or a tablet.

A vehicle accessory may be supported by an accessory mount that is selectively received by the first channel when the lock is in the unlocked state, the accessory mount movable relative to and within the first channel along the length of the housing between a plurality of positions. The mounting rail may include a first electrical connector and the accessory mount may include a second electrical connector, the first electrical connector selectively coupled to the second electrical connector to form an electrical connection between the mounting rail and the accessory mount to provide at least one of power and data from the vehicle to the vehicle accessory. In one configuration, the electrical connection may be one of a USB connection and a pin connection.

The vehicle accessory may be one of a display, a pushbutton switch, and a toggle switch. Additionally or alternatively, the accessory mount may include a latch assembly, the latch assembly configured to selectively secure a position of the accessory mount relative to the housing.

A vehicle may incorporate the mounting rail.

In another configuration, an accessory mounting system for a vehicle is provided and comprises a mounting rail including a housing defining a first channel having an opening, a lock located proximate to the opening to the first channel, the lock disposed in a lock housing and movable relative to the lock housing between a locked state blocking entry into the opening of the first channel and an unlocked state spaced apart from the opening of the first channel, and a first vehicle accessory attached to an accessory mount including a post, the post configured to enter the first channel at the opening of the first channel when the lock is in the unlocked state and prevented from entering the first channel at the first opening or being removed from the first channel at the opening when the locked is in the locked state.

The accessory mounting system may include one or more of the following optional features. For example, the first vehicle accessory may be one of a display, a pushbutton switch, and a toggle switch. Additionally or alternatively, the accessory mount may include a latch assembly, the latch assembly configured to selectively secure a position of the accessory mount relative to the housing.

The lock may extend from an outer surface of the lock housing in the locked state and may be recessed from the outer surface of the lock housing in the unlocked state. The lock may be movable between the locked state and the unlocked state in response to a signal received from an external device.

In one configuration, the mounting rail may include a first electrical connector and the accessory mount may include a second electrical connector, the first electrical connector selectively coupled to the second electrical connector to form an electrical connection between the mounting rail and the accessory mount to provide at least one of power and data from the vehicle to the first vehicle accessory. The electrical connection may be one of a USB connection and a pin connection.

In yet another configuration, a vehicle is provided and comprises an instrument panel, a mounting rail including a housing attached to the instrument panel and defining a first channel having an opening, a lock located proximate to the opening to the first channel, the lock disposed in a lock housing and movable relative to the lock housing between a locked state blocking entry into the opening of the first channel and an unlocked state spaced apart from the opening of the first channel, and a first vehicle accessory attached to an accessory mount including a post, the post configured to enter the first channel at the opening of the first channel when the lock is in the unlocked state and prevented from entering the first channel at the first opening or being removed from the first channel at the opening when the locked is in the locked state.

The vehicle may include one or more of the following optional features. For example, the lock may be movable between the locked state and the unlocked state in response to a signal received from an external device, the external device being one of a mobile phone or a tablet. Additionally or alternatively, the first vehicle accessory may be one of a display, a pushbutton switch, and a toggle switch.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
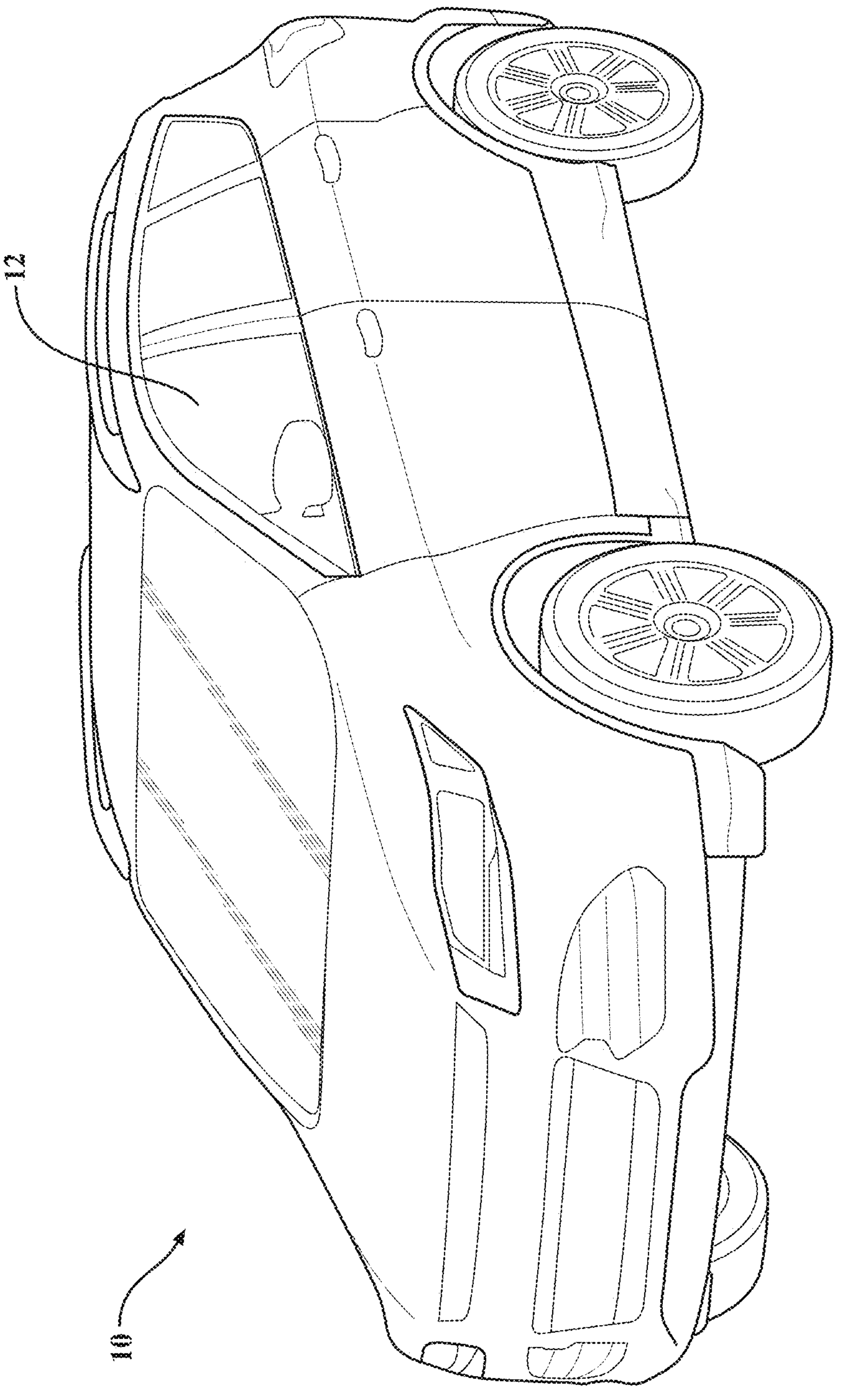
FIG. 1 is a perspective view of a vehicle in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

With reference to FIG. 1, a vehicle 10 is provided and includes a passenger compartment or cabin 12, an instrument panel (IP) 14, and an accessory mounting system 16. The IP 14 is disposed within the passenger compartment 12 and supports the accessory mounting system 16 relative to a driver seat 18 and a passenger seat 20. As will be described in detail below, the accessory mounting system 16 is used to secure and position vehicle accessories 22 relative to the IP 14 for use by a driver or passenger respectively seated in the driver seat 18 or the passenger seat 20.

The accessory mounting system 16 includes a mounting rail 24 and a lock assembly 26 configured to prevent undesired removal of a vehicle accessory 22 from the mounting rail 24. The mounting rail 24 may extend along an entire length of the IP 14 from a driver side of the vehicle 10 to a passenger side of the vehicle 10. Alternatively, the mounting rail 24 could include individual segments that are aligned with one another across the length of the IP 14 or are staggered from one another. While the mounting rail 24 could include a unitary construction that extends continuously along the length of the IP 14 or could include individual segments that are aligned with one another or staggered, the mounting rail 24 will be described and shown hereinafter as having a unitary construction that extends continuously along the length of the IP 14 from the driver side to the passenger side.

The mounting rail 24 includes a housing 28 defining a first surface 30, a second surface 32, and a third surface 34 extending between and connecting the first surface 30 and the second surface 32. As shown, the first surface 30 and the second surface 32 are formed at an angle relative to one another and cooperate with the third surface 34 to provide the housing 28 with a symmetrical construction. Specifically, the first surface 30 and the second surface 32 are each formed at an angle (Φ) relative to one another (FIG. 5) and are formed at the same angle relative to the third surface 34, thereby providing the mounting rail 24 with a symmetrical construction.

Figure 5:
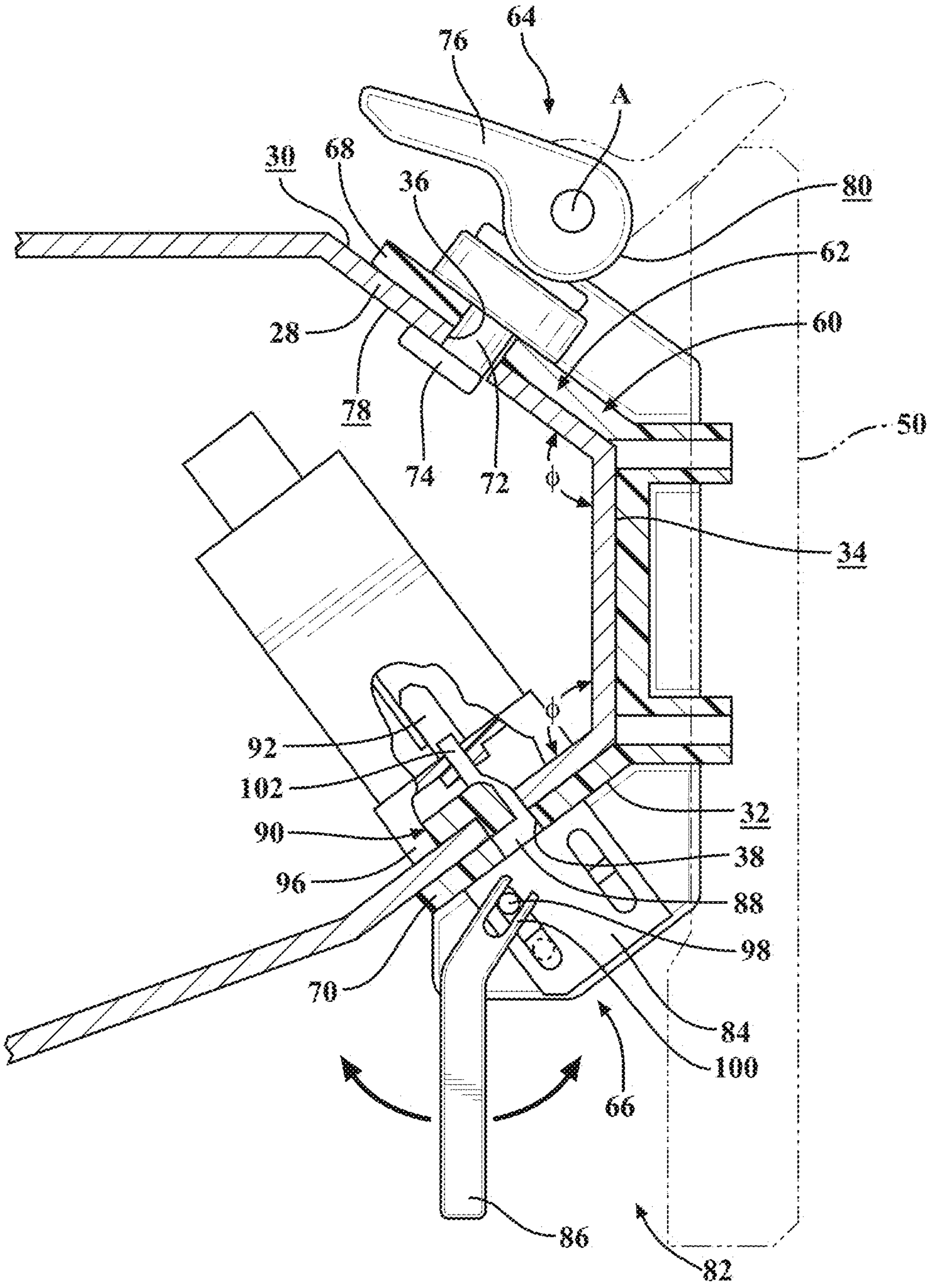
FIG. 5 is a cross-sectional view of a vehicle accessory and the mounting rail of FIG. 2 with the vehicle accessory attached to the mounting rail.
Figure 7:
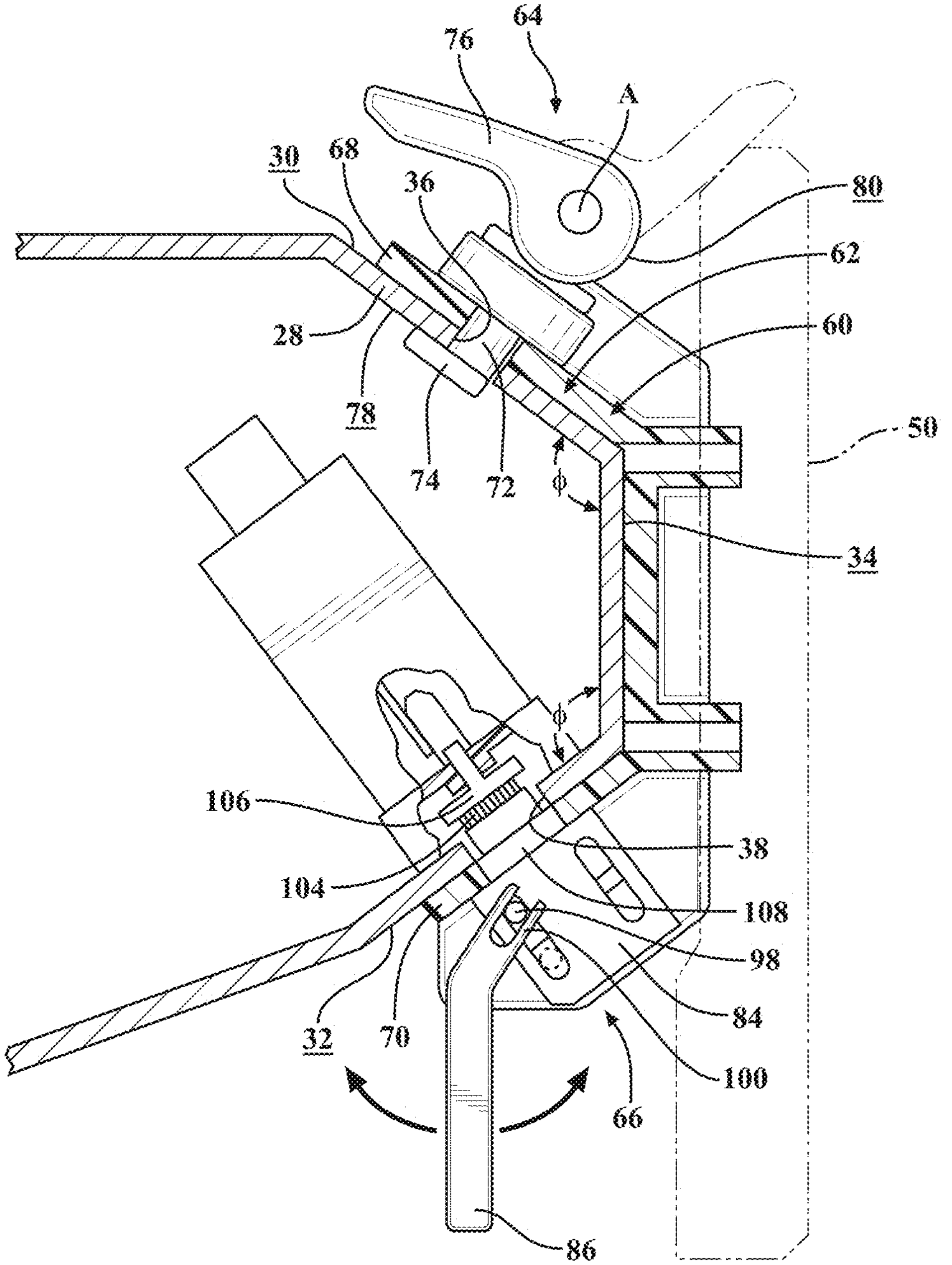
FIG. 7 is a cross-sectional view of a vehicle accessory and the mounting rail of FIG. 2 with the vehicle accessory attached to the mounting rail.

The first surface 30 includes a first channel 36 extending along a length of the first surface 30. Similarly, the second surface 32 includes a second channel 38 extending along a length of the second surface 32. The first channel 36 and the second channel 38 may be vertically aligned with one another, as shown in FIGS. 5 and 7.

The lock assembly 26 is disposed adjacent to the mounting rail 24 and includes a housing 40, a first lock 42, and a second lock 44. The housing 40 is fixed relative to the mounting rail 24 and supports the first lock 42 and the second lock 44 relative to the mounting rail 24. Specifically, the first lock 42 is aligned with and selectively blocks an opening **36*a* to the first channel 36 and the second lock 44 is aligned with and selectively blocks an opening to the second channel 38. Each of the first lock 42 and the second lock 44 is movable between a locked or extended state and an unlocked or depressed state. When the locks 42, 44 are in the extended state, the locks 42, 44 extend from the housing 40. When the locks 42, 44 are in the depressed state, the locks 42, 44 are recessed from an outer surface 46 of the housing 40 to permit access to the respective first channel 36 and second channel 38**, as will be described in greater detail below.

The first lock 42 and the second lock 44 may be biased into the extended state by a biasing member (not shown). In one configuration, the biasing member is a spring and serves to bias the first lock 42 and the second lock 44 into the extended state to prevent access to the first channel 36 and the second channel 38 and, in so doing, prevent removal of an accessory 22 from the first channel 36 and the second channel 38. The first lock 42 and the second lock 44 may be moved from the extended or locked state to the depressed or unlocked state by transmitting a signal from a mobile device 48 associated with an owner, passenger, or authorized user of the vehicle 10. Specifically, an owner, passenger, or authorized user may transmit a signal from a mobile device 48 such as a cellular phone or tablet to one or both of the first lock 42 and the second lock 44 to move one or both of the first lock 42 and the second lock 44 into the unlocked state. In so doing, the first lock and/or the second lock 44 is recessed from the outer surface 46 of the housing 40 and permits entry to the first channel 36 and/or the second channel 38. As will be described in greater detail below, when the first lock 42 and/or the second lock 44 is in the unlocked state such that access to the first channel 36 and/or the second channel 38 is permitted, a vehicle accessory 22 may be inserted into the first channel 36 and/or the second channel 38 or may be removed from the first channel 36 and/or the second channel 38.

Figure 2:
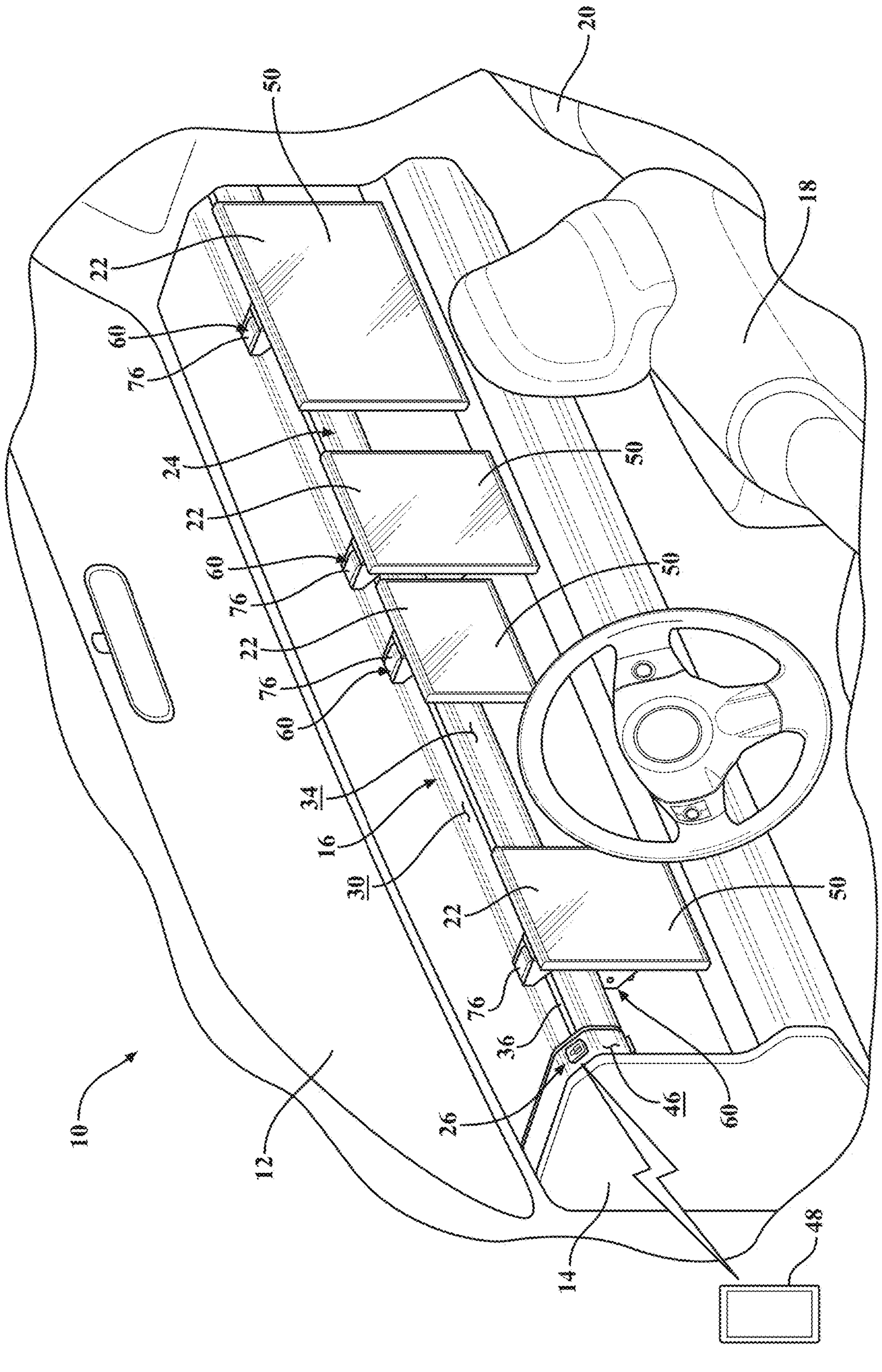
FIG. 2 is a partial perspective view of a passenger compartment of the vehicle of FIG. 1 showing a mounting rail in accordance with the principles of the present disclosure.
Figure 3:
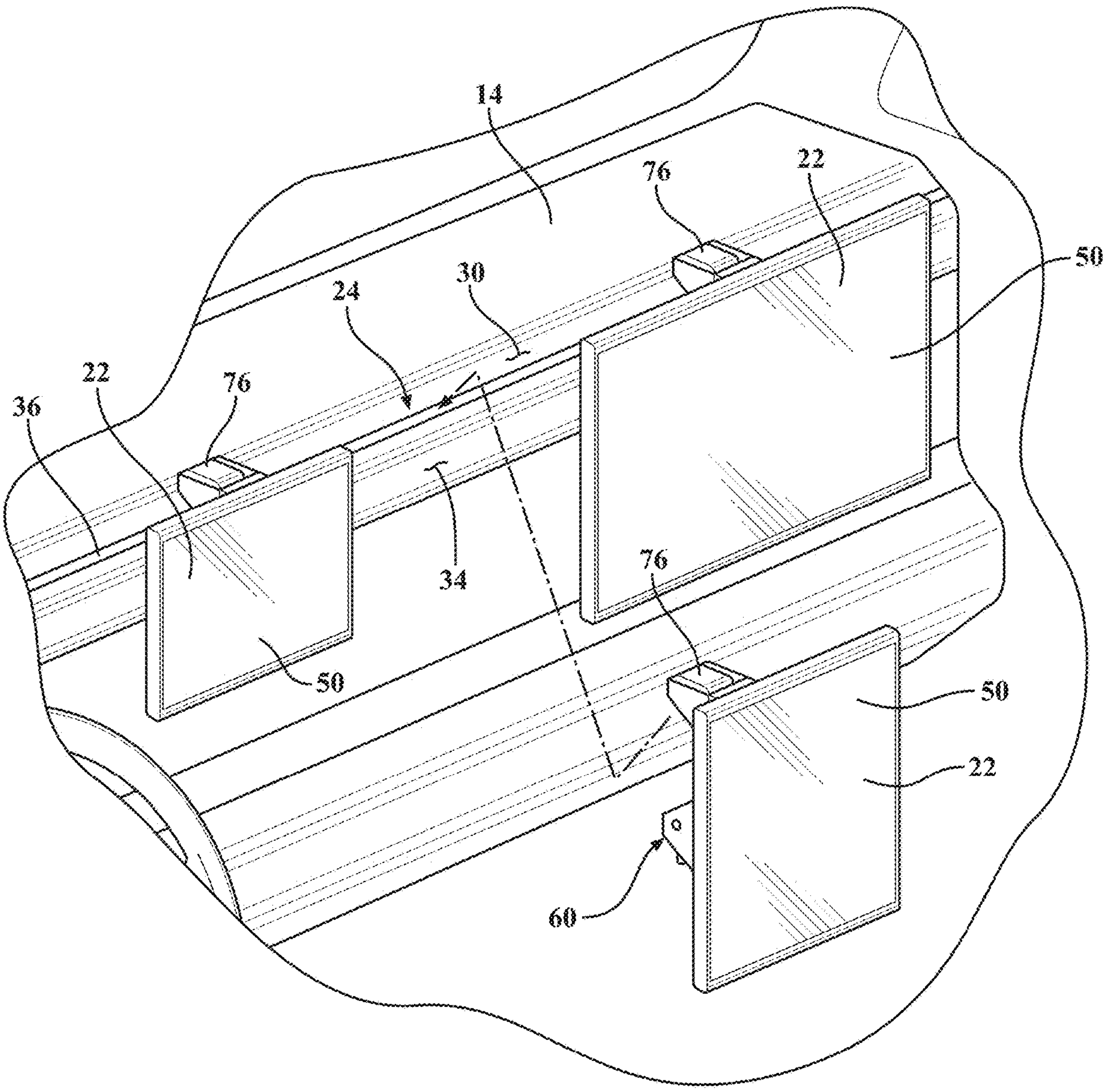
FIG. 3 is a partial perspective view of the mounting rail of FIG. 2 showing a vehicle accessory separated from the mounting rail and two vehicle accessories attached to the mounting rail.
Figure 4A:
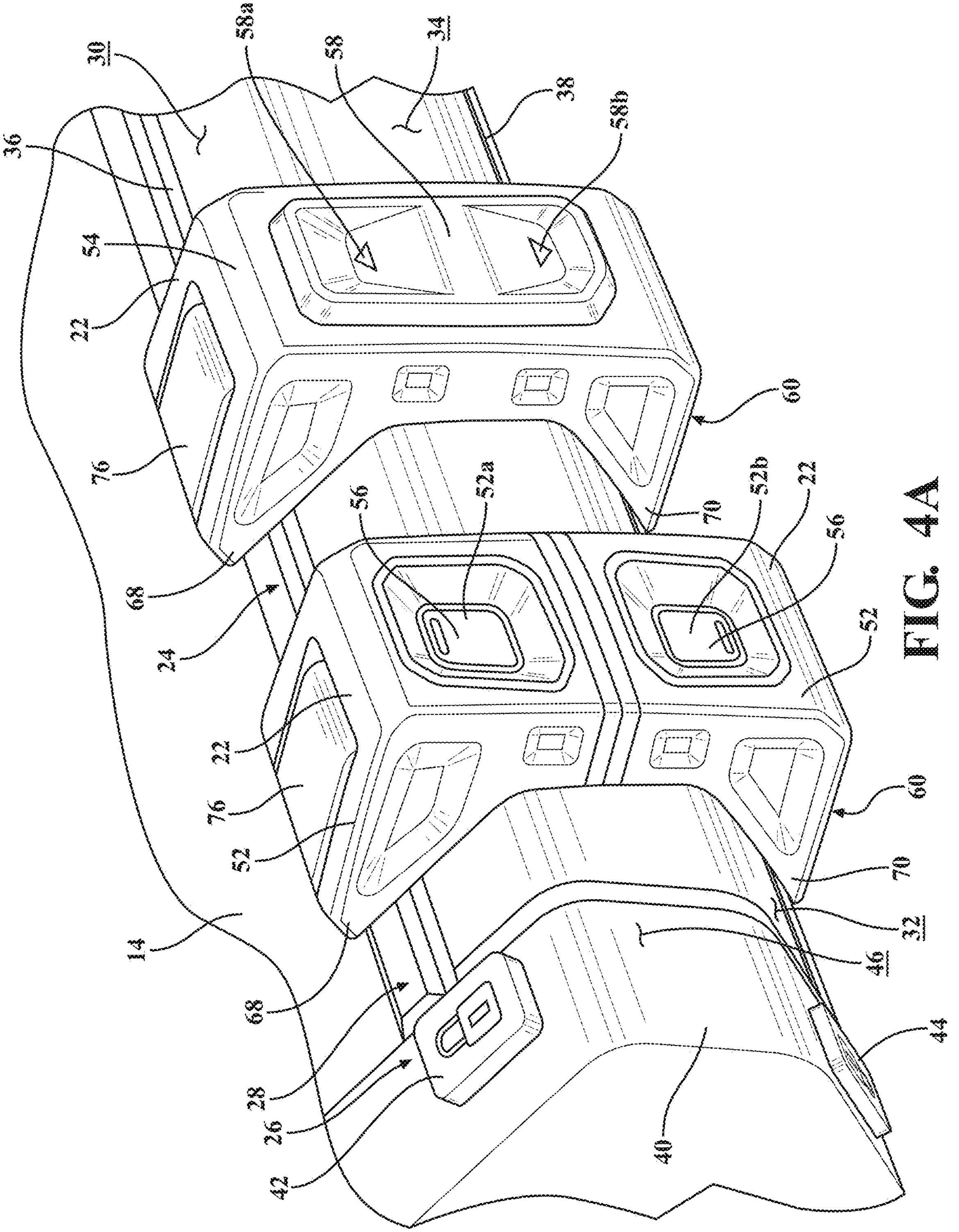
FIG. 4A is a partial perspective view of the mounting rail of FIG. 2 showing vehicle accessories attached to the mounting rail and a lock mechanism in accordance with the principles of the present disclosure, the lock mechanism in a locked state.
Figure 4B:
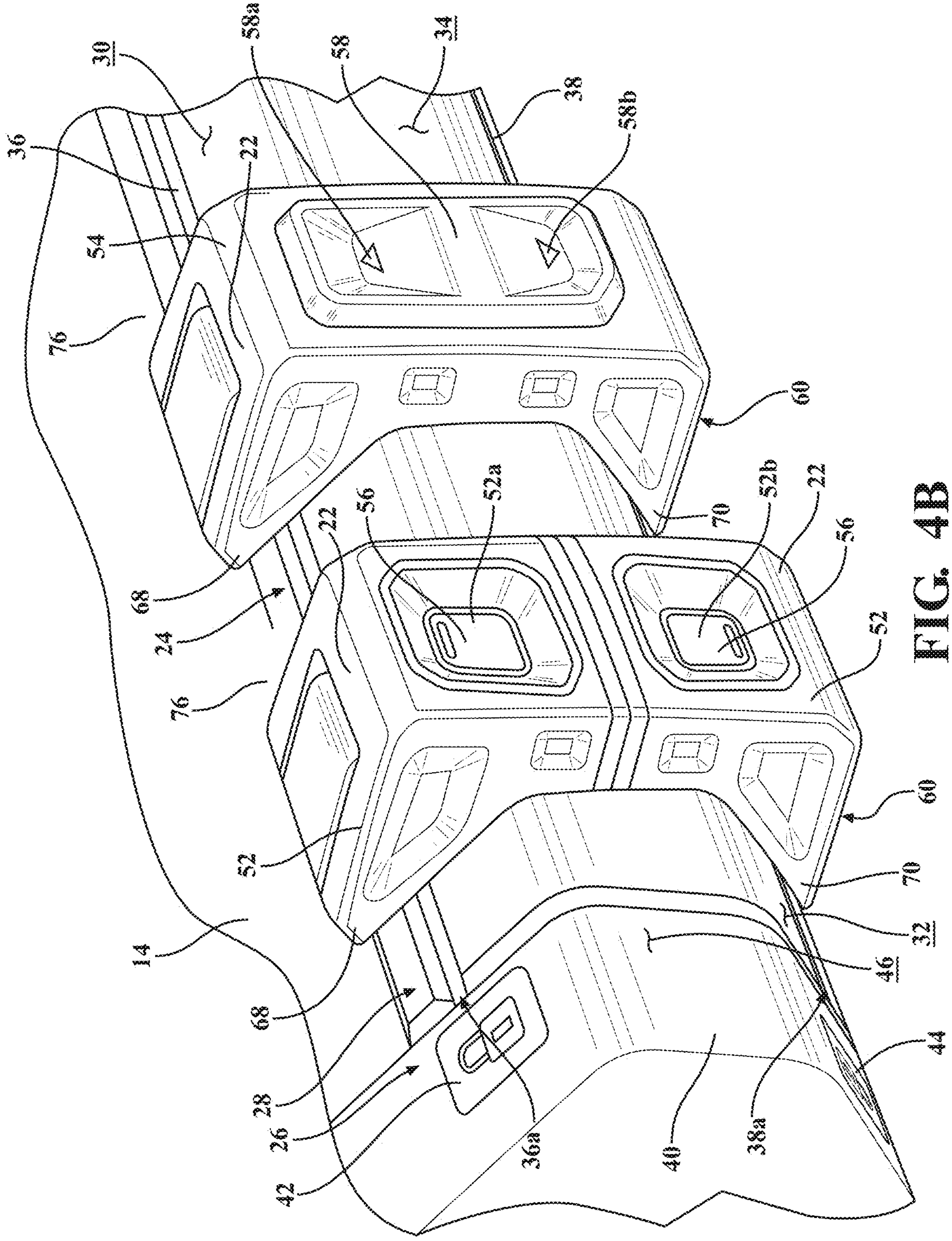
FIG. 4B is a partial perspective view of the mounting rail of FIG. 2 showing vehicle accessories attached to the mounting rail and a lock mechanism in accordance with the principles of the present disclosure, the lock mechanism in an unlocked state.

The vehicle accessory 22 may be a display 50 (FIGS. 2 and 3), a pushbutton switch 52 (FIG. 4), and/or a toggle switch 54 (FIG. 4). The displays 50 are attached to the mounting rail 24 at the first channel 36 and the second channel 38 and may be positioned adjacent to other displays 50 along a length of the mounting rail 24, as shown in FIG. 2, to provide a somewhat continuous display extending from the driver side to the passenger side. The displays 50 may be synchronized with one another such that the displays 50 are extended and cooperate to appear to be a single display. Alternatively, one or more of the displays 50 may be used individually to display different content than other displays 50. For example, two displays may cooperate to display gauges for the vehicle 10 while another display 50 may be used to display a live feed from a rear, front, and/or side camera (none shown). While the mounting rail 24 is shown as including multiple displays 50, the mounting rail 24 may receive only a single display 50 or may be free from displays 50 depending on the particular needs of the driver and/or passengers.

As shown in FIG. 4, a pair of pushbutton switches 52 are shown as being respectively attached to the mounting rail 24 at the first channel 36 and the second channel 38. Specifically, a first one **52*a* of the pushbutton switches 52 is attached to the mounting rail 24 at the first channel 36 and a second one 52*b* of the pushbutton switches 52 is attached to the mounting rail 24 at the second channel 38. Accordingly, while the pushbutton switch 52*a* is vertically aligned with the pushbutton switch 52*b*, this does not necessarily need to be the case, as the switches 52*a*, 52*b* are individually and independently attached to the mounting rail 24. Each switch 52*a*, 52*b* includes a pushbutton 56 than may be depressed to toggle a vehicle accessory in communication with the pushbutton 56 between an ON state and an OFF state. For example, one of the pushbutton switches 52 may be in communication with a winch (not shown). Accordingly, when the pushbutton switch 52 is depressed, the winch may be energized to spool a length of cable (not shown). When the pushbutton switch 52** is depressed a second time, the vehicle accessory—the winch in this example—may be stopped or may remain energized but rotate in an opposite direction to payout a length of cable.

The toggle switch 54 is attached to the mounting rail 24 at the first channel 36 and the second channel 38. The toggle switch 54 includes a switch 58 movable between a first state by pressing a first end **58*a* of the switch 58 and a second state by pressing a second end 58*b* of the switch 58. As with the pushbutton switches 52, the toggle switch 54 may be in communication with a vehicle accessory. For example, the toggle switch 54 may be in communication with a light bar (not shown) such that when the first end 58*a* of the toggle switch 54 is pressed the light bar turns ON and when the second end 58*b* of the toggle switch 54** is pressed the light bar turns OFF.

While the vehicle accessories 22 are described and shown as including a display 50, a pushbutton switch 52, and a toggle switch 54, the vehicle accessories 22 could include various other configurations. For example, the vehicle accessories 22 could include a cup holder, a mobile device holder, a dial, a portable speaker, or a fan (none shown). In short, the vehicle accessories 22 could be virtually anything that a driver or passenger could need when operating or seated within the vehicle 10.

With particular reference to FIGS. 4-7, operation of the accessory mounting system 16 will be described in detail. A vehicle accessory 22 may be attached to the mounting rail 24 by first moving one or both of the first lock 42 and the second lock 44 from the locked state to the unlocked state by transmitting a signal from a mobile device 48 to the first lock 42 and/or the second lock 44. While the locks 42, 44 are independently operable to permit the first channel 36 or the second channel 38 to individually receive a vehicle accessory 22, the following example will be described with respect to a vehicle accessory 22 that is received by both the first channel 36 and the second channel 38 such as a display 50 or the toggle switch 54 shown in FIG. 4.

When the first lock 42 and the second lock 44 are moved into the unlocked state, the first lock 42 and the second lock 44 are recessed from the outer surface 46 of the housing 40. As such, an opening to the first channel 36 and the second channel 38 is accessible. At this point, a mounting interface 60 associated with the particular vehicle accessory 22 may be inserted into the lock housing 40 at the depressions caused by each lock 42, 44 being recessed from the outer surface 46 of the housing 40.

Inserting the mounting interface 60 into the depressions caused by the locks 42, 44 being moved into the depressed or unlocked state aligns the mounting interface 60 with the first channel 36 and the second channel 38 of the mounting rail 24. At this point, the mounting interface 60 as well as the display 50 may be translated from a location over the depressed locks 42, 44 and into the channels 36, 38. Once the mounting interface 60 is received within the channels 36, 38, the mounting interface 60 may be moved along the mounting rail 24 along with the display 50 until a desired position of the display 50 along the mounting rail 24 is achieved.

As shown in FIGS. 5 and 7, the mounting interface 60 includes a housing 62 supporting the particular vehicle accessory 22. In the present example, and as shown in FIGS. 5 and 7, the housing 62 is fixedly attached to a display 50. Accordingly, when the housing 62 of the mounting interface 60 is moved along the mounting rail 24, the display 50 is moved along the mounting rail 24 with the housing 62.

The mounting interface 60 includes a latch assembly 64 located proximate to a first end 68 of the housing 62 and a connection assembly 66 located proximate to a second end 70 of the housing 62. The latch assembly 64 functions to attach the first end 68 of the housing 62 to the mounting rail 24 while the connection assembly 66 functions to both attach the second end 70 of the housing 62 to the mounting rail 24 and to provide for communication between the vehicle accessory 50 and the vehicle 10.

The latch assembly 64 includes a post 72, a retainer 74, and a cam-actuated lever 76. The post 72 extends from the cam-actuated lever 76, through the first channel 36, and is attached to the retainer 74 at a distal end thereof. The retainer 74 opposes and is in contact with a back surface 78 of the housing 28 when the post 72 is inserted into the first channel 36. When the mounting interface 60 first approaches the mounting rail 24 and the first lock 42 is in the unlocked state, the retainer 74 opposes an outer surface of the first lock 42 and the post 72 is aligned with the first channel 36. Because the first lock 42 is recessed from the outer surface 46 of the housing 40, the retainer 74 may be positioned below the rear surface 78 of the mounting rail 24. Further, with the cam-actuated lever 76 in the position shown in phantom lines in FIGS. 5 and 7, there is sufficient clearance between the retainer 78 and the back surface 78 to permit the retainer 78 to move relative to and along the back surface 78 as the post 72 traverses the first slot 36.

Once a desired position of the vehicle accessory 22 along the mounting rail 24 is achieved, a force may be applied to the cam-actuated lever 76 to rotate the lever 76 into the position shown in FIGS. 5 and 7 about an axis A. Because the cam-actuated lever 76 includes a cam surface 80, such rotation effectively causes the post 72 to move in a direction away from the first surface 30 of the mounting rail 24. In so doing, a force is applied to the retainer 74 causing the retainer 74 to move in the same direction as the post 72 until the retainer 74 engages the back surface 78 of the mounting rail 24. At this point, the mounting rail 24 is effectively clamped between the retainer 74 and the cam-actuated lever 76, thereby restricting movement of the mounting interface 60 and, thus, the display 50 relative to the mounting rail 24.

The connection assembly 66 includes an actuator assembly 82 that may be moved from an engaged state (FIGS. 5 and 7) to a disengaged state. When the actuator assembly 82 is in the engaged state, the mounting interface 60 is in electrical communication with the vehicle 10 such that the vehicle 10 may provide the mounting interface 60 with power and/or data. The power and/or data may be provided to the vehicle accessory 22 due to an electrical connection of the housing 62 of the mounting interface 60 and the vehicle accessory 22. In the present example, when the housing 62 is placed in electrical communication with the vehicle 10 by the actuator assembly 82, power and/or data from the vehicle 10 may be supplied to the display 50 via the electrical connection of the housing 62 of the mounting interface 60 and the mounting rail 24, as will be described in more detail below.

Figure 6:
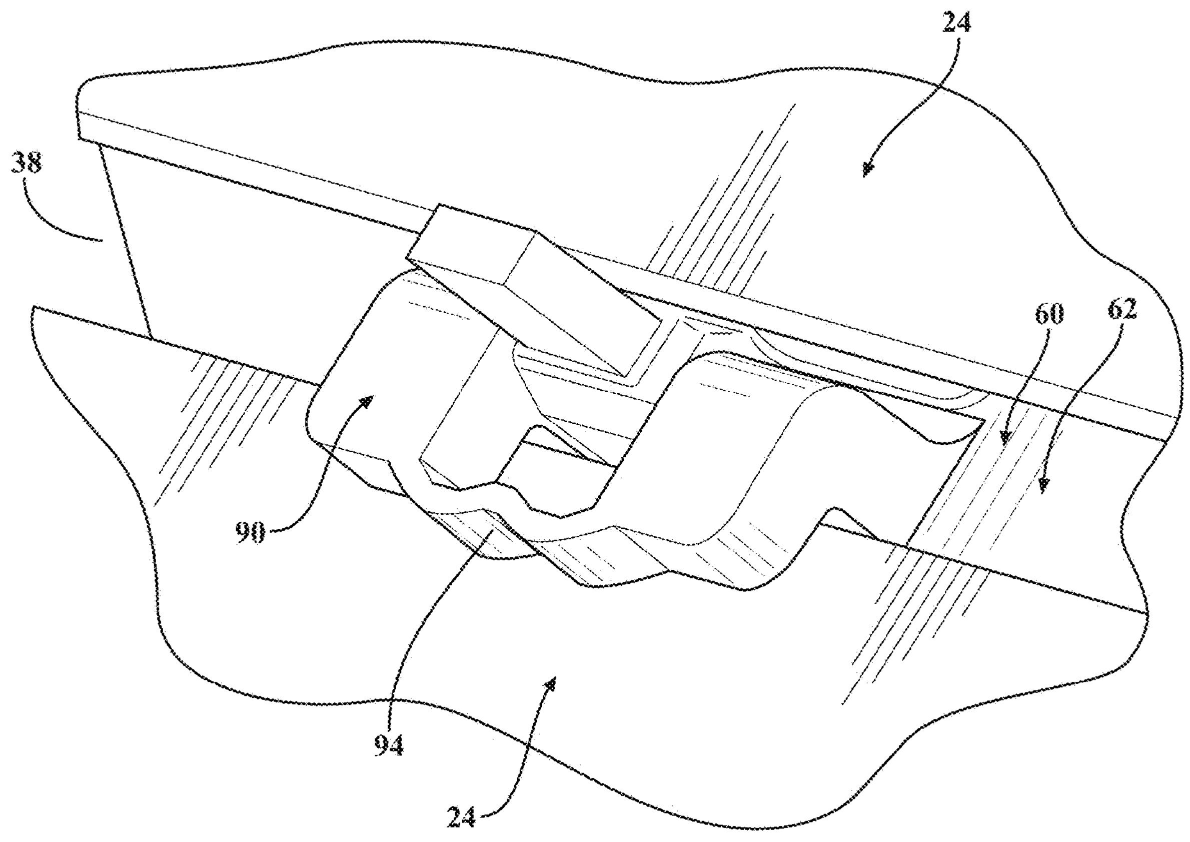
FIG. 6 is a detent mechanism of the vehicle accessory of FIG. 5.

With reference to FIGS. 5 and 6, the actuator assembly 82 is shown as including a housing 84, a lever 86, a USB housing 88, and a detent mechanism 90. As will be described, when the mounting interface 60 is positioned in one of a number of positions along the mounting rail 24, the USB housing 88 will be positioned such that the USB housing 88 opposes and is aligned with a USB port 92 associated with the vehicle 10.

During operation, when the mounting interface 60 is moved along the mounting rail 24 within the second channel 38, the detent mechanism 90 moves along with the mounting interface 60. As shown in FIG. 6, the detent mechanism 90 extends through the second channel 38 and includes a depression 94 that moves along with the mounting interface 60 relative to the mounting rail 24. When the detent mechanism 90 encounters any one of a number of USB ports 92 of the vehicle 10 (located behind the mounting rail 24 and opposing the back surface 78), the detent mechanism 90 engages a housing 96 of the USB port 92 to properly locate the USB housing 88 relative to the USB port 92. Specifically, a portion of the housing 96 is received by the detent mechanism 90 such that the housing 96 is disposed within the depression 94.

When the USB housing 88 is aligned with the USB port 92 of the vehicle 10, and the housing 96 is received within the depression 94 of the detent mechanism 90, a force may be applied to the lever 86 to rotate the lever 86 relative to the housing 84. In so doing, a force is applied to the USB housing 88, causing the USB housing 88 to move in a direction toward the USB port 92 due to a connection between one or more pins 98 of the USB housing 88 and a fork 100 of the lever 86. Specifically, when the lever 86 is rotated in the clockwise direction relative to the view shown in FIG. 5, engagement between the fork 100 of the lever 86 and the pin 98 of the USB housing 88 causes the fork 100 to exert a force on the pin 98, thereby causing the USB housing 88 to move relative to the housing 84 and in a direction toward the USB port 92.

When the USB housing 88 is sufficiently moved in a direction toward the USB port 92, a USB connector 102 fixed for movement with the USB housing 88 is received by the USB port 92 of the vehicle 10, thereby placing the mounting interface 60 and, thus, the display 50, in electrical communication with the vehicle 10. At this point, the display 50 may receive power and/or data from the vehicle 10 due to the connection between the USB port and the USB connector 102.

With particular reference to FIG. 7, the mounting interface 60 is shown as being electrically coupled to the vehicle via pin connectors 104. In this configuration, the vehicle 10 includes a series of pins 106 extending along substantially the entire length of the mounting rail 24 and is used in place of the USB ports 92 described above. In this configuration, the pin connectors 104 of the mounting interface 60 may engage the series of pins 106 associated with the vehicle 10 at virtually any location along the length of the mounting rail 24. When the pin connectors 104 are engaged with the pins 106 of the vehicle 10, the mounting interface 60 and, thus, the display 50, are electrically coupled to the vehicle 10 to allow the vehicle 10 to supply the display 50 with power and/or data.

In operation, the mounting interface 60 may be moved along the mounting rail 24 until a desired position of the display 50 along the mounting rail 24 is achieved. At this point, a force may be applied to the lever 86 to rotate the lever 86 in the clockwise direction relative to the view shown in FIG. 7 to move a pin housing 108 supporting the pin connectors 104 in a direction toward the pins 106 of the vehicle 10. Specifically, as with the USB housing 88 of FIG. 5, rotation of the lever 84 in the clockwise direction relative to the view shown in FIG. 7 causes a fork 100 to engage pins 98 of the pin housing 108, thereby causing the pin housing 108 to move the pin connectors 104 into engagement with the pins 106 of the vehicle 10. At this point, the vehicle 10 may supply the display 50 with power and/or data. The position of the mounting interface 60 may be retained by rotating the cam-actuated lever 76 in a counterclockwise direction relative to the view shown in FIG. 7 to engage the retainer 74 with the back surface 78.

While the vehicle accessories 22 are described and shown as being connected to the vehicle 10 via a USB or pin connection, the vehicle accessories 22 could additionally or alternatively be in communication with the vehicle 10 via a wireless connection. For example, the vehicle accessories 22 could be in communication with the vehicle 10 via a Bluetooth® connection.

Once the mounting interface 60 is received by the first channel 36 and the second channel 38, the first lock 42 and the second lock 44 may be returned to the locked state. At this point, the first lock 42 and the second lock 44 once again protrude from the outer surface 46 of the housing 40. In so doing, the first lock 42 and the second lock 44 block the entrances to the first channel 36 and the second channel 36 and prevent removal of the vehicle accessories 22 from the mounting rail 24 until the first lock 42 and the second lock 44 are returned to the unlocked state.

As described, a mounting rail 24 for use with a vehicle 10 provides a driver or passenger with the ability to secure vehicle accessories 22 at a number of locations along the mounting rail 24 and, further, with the ability to continuously modify and move the accessories 22 along the mounting rail 24. Further, connection of the vehicle accessories 22 to the mounting rail 24 also provides the vehicle accessories 22 with power and/or data from the vehicle 10.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A mounting rail system for a vehicle, the mounting rail system comprising:
- a mounting rail including a housing that includes a first portion and a second portion;
- a first channel extending along the first portion of the housing between a first end and a second end, the first end defining an opening to the first channel;
- a second channel extending along the second portion of the housing between a third end and a fourth end, the third end defining an opening to the second channel; and
- a first lock located proximate to the opening to the first channel, the first lock disposed in a lock housing and movable relative to the lock housing between a locked state blocking entry into the opening of the first channel and an unlocked state spaced apart from the opening of the first channel; and
- a second lock located proximate to the opening to the second channel, the second lock disposed in the lock housing and movable relative to the lock housing between a locked state blocking entry into the opening of the second channel and an unlocked state spaced apart from the opening of the second channel, the first lock and the second lock being independently operable.

2. The mounting rail system of claim 1, wherein each of the first lock and the second lock extends from an outer surface of the lock housing in the locked state and is recessed from the outer surface of the lock housing in the unlocked state.

3. The mounting rail system of claim 2, wherein each of the first lock and the second lock is movable between the locked state and the unlocked state in response to a signal received from an external device.

4. The mounting rail system of claim 3, wherein the external device is at least one of a mobile phone or a tablet.

5. The mounting rail system of claim 1, further comprising a vehicle accessory supported by an accessory mount that is selectively received by the first channel when the first lock is in the unlocked state, the accessory mount movable relative to and within the first channel along a length of the housing between a plurality of positions.

6. The mounting rail system of claim 5, wherein the mounting rail includes a first electrical connector and the accessory mount includes a second electrical connector, the first electrical connector selectively coupled to the second electrical connector to form an electrical connection between the mounting rail and the accessory mount to provide at least one of power and data from the vehicle to the vehicle accessory.

7. The mounting rail system of claim 6, wherein the electrical connection is one of a USB connection and a pin connection.

8. The mounting rail system of claim 5, wherein the vehicle accessory is one of a display, a pushbutton switch, and a toggle switch.

9. The mounting rail system of claim 5, wherein the accessory mount includes a latch assembly, the latch assembly configured to selectively secure a position of the accessory mount relative to the housing.

10. A vehicle incorporating the mounting rail system of claim 1.

11. An accessory mounting system for a vehicle, the accessory mounting system comprising:

a mounting rail including a housing defining a first channel having an opening and a second channel having an opening;

a first lock located proximate to the opening to the first channel, the first lock disposed in a lock housing and movable relative to the lock housing between a locked state blocking entry into the opening of the first channel and an unlocked state spaced apart from the opening of the first channel;

a second lock located proximate to the opening to the second channel, the second lock disposed in the lock housing and movable relative to the lock housing between a locked state blocking entry into the opening of the second channel and an unlocked state spaced apart from the opening of the second channel, the first lock and the second lock being independently operable; and a first vehicle accessory attached to an accessory mount including a post, the post configured to enter the first channel at the opening of the first channel when the first lock is in the unlocked state and prevented from entering the first channel at the opening of the first channel or being removed from the first channel at the opening when the first lock is in the locked state.

12. The accessory mounting system of claim 11, wherein the first vehicle accessory is one of a display, a pushbutton switch, and a toggle switch.

13. The accessory mounting system of claim 11, wherein the accessory mount includes a latch assembly, the latch assembly configured to selectively secure a position of the accessory mount relative to the housing.

14. The accessory mounting system of claim 11, wherein each of the first lock and the second lock extends from an outer surface of the lock housing in the locked state and is recessed from the outer surface of the lock housing in the unlocked state.

15. The accessory mounting system of claim 14, wherein each of the first lock and the second lock is movable between the locked state and the unlocked state in response to a signal received from an external device.

16. The accessory mounting system of claim 11, wherein the mounting rail includes a first electrical connector and the accessory mount includes a second electrical connector, the first electrical connector selectively coupled to the second electrical connector to form an electrical connection between the mounting rail and the accessory mount to provide at least one of power and data from the vehicle to the first vehicle accessory.

17. The accessory mounting system of claim 16, wherein the electrical connection is one of a USB connection and a pin connection.

18. A vehicle comprising:

an instrument panel;

a mounting rail including a housing attached to the instrument panel and defining a first channel having an opening and a second channel having an opening;

a first lock located proximate to the opening to the first channel, the first lock disposed in a lock housing and movable relative to the lock housing between a locked state blocking entry into the opening of the first channel and an unlocked state spaced apart from the opening of the first channel;

a second lock located proximate to the opening to the second channel, the second lock disposed in the lock housing and movable relative to the lock housing between a locked state blocking entry into the opening of the second channel and an unlocked state spaced apart from the opening of the second channel, the first lock and the second lock being independently operable; and a first vehicle accessory attached to an accessory mount including a post, the post configured to enter the first channel at the opening of the first channel when the first lock is in the unlocked state and prevented from entering the first channel at the opening of the first channel or being removed from the first channel at the opening when the first lock is in the locked state.

19. The vehicle of claim 18, wherein each of the first lock and the second lock is movable between the locked state and the unlocked state in response to a signal received from an external device, the external device being one of a mobile phone or a tablet.

20. The vehicle of claim 18, wherein the first vehicle accessory is one of a display, a pushbutton switch, and a toggle switch.

* * * * *